(12) United States Patent
Gillia et al.

(10) Patent No.: US 9,010,272 B2
(45) Date of Patent: Apr. 21, 2015

(54) DEVICE AND METHOD FOR DEPOSITING A POWDER MIXTURE FOR FORMING AN OBJECT WITH COMPOSITION GRADIENTS

(75) Inventors: Olivier Gillia, Sassenage (FR); Basile Caillens, Montpellier (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 531 days.

(21) Appl. No.: 13/130,148

(22) PCT Filed: Nov. 26, 2009

(86) PCT No.: PCT/EP2009/065932
§ 371 (c)(1),
(2), (4) Date: Jul. 18, 2011

(87) PCT Pub. No.: WO2010/060969
PCT Pub. Date: Jun. 3, 2010

(65) Prior Publication Data
US 2011/0262638 A1    Oct. 27, 2011

(30) Foreign Application Priority Data

Nov. 27, 2008 (FR) ...................... 08 58065

(51) Int. Cl.
*B05B 7/14* (2006.01)
*B01F 5/22* (2006.01)
(Continued)

(52) U.S. Cl.
CPC ................. *B01F 5/26* (2013.01); *B05B 7/1445* (2013.01); *B01F 5/22* (2013.01); *B01F 15/00876* (2013.01); *B05C 19/06* (2013.01); *B05C 19/04* (2013.01); *B01F 3/18* (2013.01); *B01F 7/00816* (2013.01); *B01F 13/1005* (2013.01); *B01F 15/00344* (2013.01);
(Continued)

(58) Field of Classification Search
USPC .................. 118/663; 700/118–120, 239–244; 366/65
See application file for complete search history.

(56) References Cited

U.S. PATENT DOCUMENTS 4,190,369 A * 2/1980 Rikker ........................... 366/16
4,443,109 A    4/1984 Watts
(Continued)

FOREIGN PATENT DOCUMENTS

DE    10 2007 050268    4/2009
FR    2 666 077    2/1992
(Continued)

OTHER PUBLICATIONS

International Search Report issued Feb. 25, 2010 in PCT/EP09/065932 filed Nov. 26, 2009.

*Primary Examiner* — Dah-Wei D Yuan
*Assistant Examiner* — Binu Thomas
(74) *Attorney, Agent, or Firm* — Oblon, McClelland, Maier & Neustadt, L.L.P.

(57) ABSTRACT

A device for depositing a mixture of powders to form an object with composition gradients, including: a plurality of tanks respectively configured to contain different powders; a powder mixer placed under the tanks and including a rotatably mounted mixing member; a plurality of powder dispensing mechanisms respectively cooperating with the tanks, and each configured to regulate mass flow rate of the powder escaping from a respective of the tanks towards the mixer; a powder mixture collector placed under the mixer; and a powder mixture dispenser placed under the collector.

10 Claims, 8 Drawing Sheets

(51) Int. Cl.
  *B01F 5/00* (2006.01)
  *B01F 15/04* (2006.01)
  *B05C 19/00* (2006.01)
  *B01F 5/26* (2006.01)
  *B01F 15/00* (2006.01)
  *B01F 3/18* (2006.01)
  *B01F 7/00* (2006.01)
  *B01F 13/10* (2006.01)
  *B01F 15/02* (2006.01)
  *B22F 1/00* (2006.01)
  *B22F 3/00* (2006.01)
  *B22F 7/00* (2006.01)
  *C04B 35/626* (2006.01)
  *B05C 19/06* (2006.01)
  *B05C 19/04* (2006.01)

(52) U.S. Cl.
  CPC ........ *B01F 15/0201* (2013.01); *B01F 15/0234* (2013.01); *B01F 15/0253* (2013.01); *B01F 15/0263* (2013.01); *B01F15/0404* (2013.01); *B01F 15/0483* (2013.01); *B01F 2215/0075* (2013.01); *B22F 1/0003* (2013.01); *B22F 3/004* (2013.01); *B22F 7/00* (2013.01); *B22F 2999/00* (2013.01); *C04B 35/626* (2013.01)

(56) References Cited

U.S. PATENT DOCUMENTS

| | | | | |
|---|---|---|---|---|
| 5,148,943 | A | * | 9/1992 | Moller ............................... 222/1 |
| 5,913,602 | A | | 6/1999 | Steele |
| 6,357,905 | B1 | * | 3/2002 | Birchard ......................... 366/65 |
| 6,811,301 | B2 | * | 11/2004 | Packard ......................... 366/141 |
| 2004/0247922 | A1 | | 12/2004 | Chaput et al. |
| 2005/0267628 | A1 | * | 12/2005 | Crowder et al. .............. 700/240 |
| 2007/0071632 | A1 | * | 3/2007 | Revol ............................... 419/38 |
| 2010/0220546 | A1 | * | 9/2010 | Konermann .................. 366/141 |

FOREIGN PATENT DOCUMENTS

| | | |
|---|---|---|
| FR | 2 862 893 | 6/2005 |
| JP | 62 277136 | 12/1987 |

* cited by examiner

DEVICE AND METHOD FOR DEPOSITING A POWDER MIXTURE FOR FORMING AN OBJECT WITH COMPOSITION GRADIENTS

The invention generally relates to the field of objects with composition gradients, also known under the name of FMG (« Functionally Graded Materials» ).

This type of object finds applications in a very large number of technical fields. As an example, this may be an object made up from a ceramic material and a metal material, the proportions by mass of both materials in the mixture, also called mass proportions, subject to time-dependent changes within the same object, and set according to the encountered needs. For example, an object may be designed so as to gradually change in a given direction of the latter from a composition entirely in ceramic material to a composition entirely in metal material, while passing through a transient mixing zone between both of these materials. One then refers to a composition gradient in said given direction of the relevant object.

In order to make this type of object, one generally resorts to techniques for depositing powders, a deposit which is then consolidated by known techniques such as sintering or hot isostatic compaction.

Consequently, the apparatus used for making this type of object with composition gradients includes a device for depositing a mixture of powders, which is set into motion relatively to a support onto which the mixture is intended to be deposited, for example by means of a robot.

Nevertheless, with the design of known deposition devices, it is not possible to obtain perfectly satisfactory homogeneity of the mixtures of powders which are extracted therefrom, implying that conformity flaws may occur between the produced objects and the desired objects. Of course, this drawback is also expressed by problems of reproducibility of the desired objects.

To find a remedy to these drawbacks, first of all the object of the invention is a device for depositing a mixture of powders in order to form an object with composition gradients, said device including the following elements:

- a plurality of tanks (R1, . . . , Rn) respectively intended to contain different powders (A1, . . . , An);
- a powder mixer placed under said tanks (R1, . . . , Rn), said mixer including a rotatably mounted mixing member and intended to be impacted by the powders (A1, . . . , An) from the tanks;
- a plurality of means for dispensing powder respectively co-operating with the tanks (R1, . . . , Rn), and each designed for regulating the mass flow rate of the powder escaping therefrom towards said mixer;
- a powder mixture collector placed under said mixer and communicating with the latter; and
- a powder mixture dispenser placed under said powder mixture collector and communicating with the latter.

The device according to the invention advantageously has a simple design giving the possibility of obtaining highly satisfactory homogeneity of the mixture of powders stemming from the dispenser, of limiting or even eradicating entirely the lacks of conformity between the produced objects and the desired objects. Thus, this deposition device allows reliable, controlled and reproducible manufacturing of objects, ensuring a specific composition in each point of the formed objects.

The number « n » of tanks is selected depending on the desired number of different powders for manufacturing a same object. Consequently it is by no means limited to two. Moreover, regardless of the number of integrated tanks within the device, the latter may naturally contain a powder which already corresponds to a mixture of several given powders.

Preferably, said rotatably mounted mixing member has a first surface for impact of the powders of general conical shape with an axis corresponding to the axis of rotation of this member.

Preferably, said mixer includes a second surface for impact of powders with a general conical shape, laid out coaxially and facing said first powder impact surface, in order to form between the latter an interstice for letting through the powders, with a general conical shape.

Preferably, said first impact surface for powders with a general conical shape has one or several recesses. These recesses allow still further improvement of the mixing of the powders.

Preferably, said mixing member is rotatably mounted on a guiding part of the mixer, equipped with one or more passage orifices communicating with said powder mixture collector above which they are found.

Preferably, for efficient flow by gravity of the mixture of powders through the guiding part, in any point of the surface delimiting each passage orifice, provision is made for having this delimitation surface form an angle of less than 40° with the vertical, and preferably of less than 30°.

With a same purpose, it is preferably provided that in any point of the delimitation surface of said powder mixture collector, this delimitation surface forms an angle of less than 40° with the vertical, and preferably of less than 30°.

Preferentially, the device further includes a collector of the powders (A1, . . . , An) placed under said dispensing means between the latter and said mixer. In this respect, always with the same purpose of obtaining an efficient flow by gravity of the powders within this collector, it is preferably provided that in any point of the delimitation surface of said powder collector (A1, . . . , An), this delimitation surface forms an angle of less than 40° with the vertical, and preferably less than 30°.

Preferably, each of said dispensing means assumes the form of a device for delivering powder by vibrations of a powder supporting element. Thus, it is possible to perfectly control the mass flow rate of powder escaping from each dispensing means, depending on the frequency and on the amplitude of the vibrations of the delivery means. Consequently, the composition of the obtained object is also perfectly under control.

The object of the invention is also an installation for depositing a mixture of powders for forming an object with composition gradients, comprising a deposition device as described above and mounted on means for setting it into spatial motion, said installation comprising a control unit with which said motion initiating means may be controlled as well as each of said dispensing means.

Preferably, said control unit takes into account, in order to control each of said dispensing means over a period T:

- the time-dependent change of the mass proportions of the powders A1, . . . , An within a mixture of powders to be deposited, over said period T;
- representative values of the specific gravity of the mixture of powders after deposition, depending on the mass proportions of the powders A1, . . . , An in this mixture; and
- the latency time (t1) associated with the deposition device, corresponding to the time having elapsed between the instant when the controls are transmitted to the powder dispensing means in order to obtain a mixture of powders having given mass proportions, and the instant at which this mixture of powders is deposited.

Preferably, the period T corresponds to a duration for forming an entire powder mixture layer, or even to a duration for forming a plurality of superposed layers.

The time-dependent change of the mass proportions of the powders $A_1, \ldots, A_n$ within a mixture of powders to be deposited, over the period T, is determined beforehand depending on the desired composition in each point of the object to be manufactured. This time-dependent change may equally assume the form of a continuous curve versus time, with values for given instants, or any other form.

Preferably, in order to make sure that the deposited powder mixture layer has substantially constant thickness, notably with view to superposition of several layers, the mass flow rates of each powder, for each instant t of the period T, are actually determined from the desired mass proportion for the mixture at this instant t, and from the representative value of the specific gravity of this mixture after deposition. In this respect, it is noted that these representative values may be determined beforehand, for example by calibration. This may be the actual specific gravity, the density, or further any other value estimated to be representative thereof.

Also, as this emerges from the foregoing, in order to take into account the crossing time of the powders within the device, the determination of the mass flow rates to be applied at each instant t of the period T takes into account the aforementioned latency time. The latter corresponds in other words to the delay to which the powders are subject between the dispensing orders which are associated with them, and their actual deposition on the support, after their leaving the dispenser.

Next, the mass flow rates of the powders determined in the way discussed above are transformed into controls of the means for dispensing these powders, for example assuming the form of electric signals feeding these means, the link between the flow rates and the controls being also determined beforehand, for example by calibration.

Preferably, said control unit takes into account, in order to control said means for setting the deposition device into motion, over a period T, the time-dependent change of the position (x,y) to be adopted for the powder mixture dispenser, over the period T.

The coordinates x and y of the position may correspond to coordinates in a planar reference system associated with the support onto which the powder mixture layer is to be deposited. In the case when the intention would be to make the object by superposition of layers, the coordinates may further comprise a variable z related to the height of the dispenser relatively to the support on which the layers are deposited.

Naturally, it is ensured that the control of the means for setting into motion the device and the controls of the dispensing means are fixed in time relatively to each other.

The object of the invention is also a method for making an object with composition gradients by means of a device or of an installation described above, wherein the object with composition gradients is made from the formation of at least one layer of a mixture of powders deposited on a support, by setting into motion said powder mixture dispenser relatively to said support.

Preferably, for making said powder mixture layer, said powder mixture dispenser is set into motion so as to produce a sweep of the surface of the support on which said layer has to be deposited, the control of at least one of the dispensing means varying during said sweep. With this, one or several composition gradients may advantageously be obtained in the plane of the thickness of the deposited layer, these gradients therefore may be added to those which may be obtained by the superposition of several layers of different compositions.

Other advantages and features of the invention will become apparent in the non-limiting detailed description below.

This description will be made with reference to the appended drawings wherein.

Figure 1:
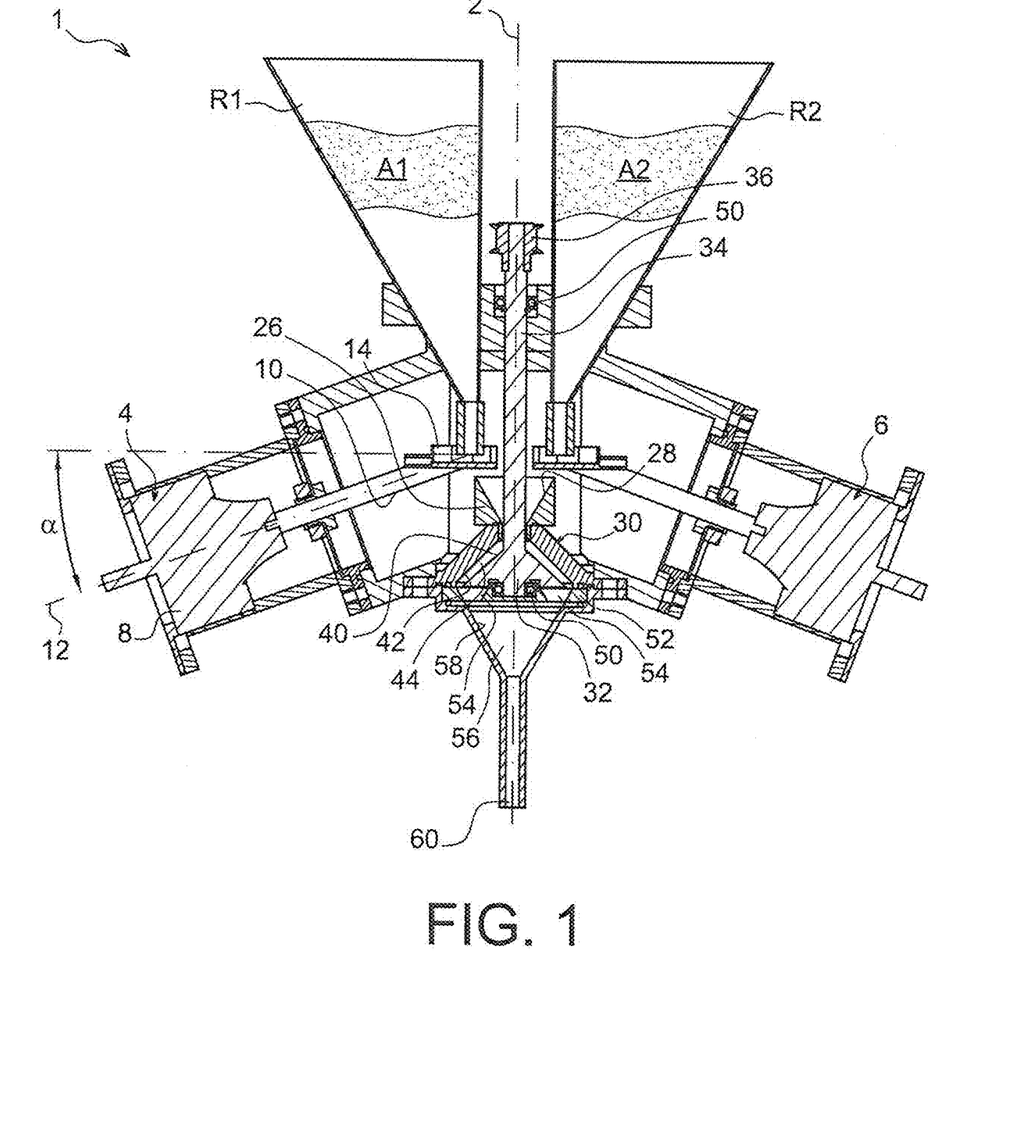
FIG. 1 illustrates a sectional view of a device for depositing a mixture of powders, according to a preferred embodiment of the present invention.
Figure 2:
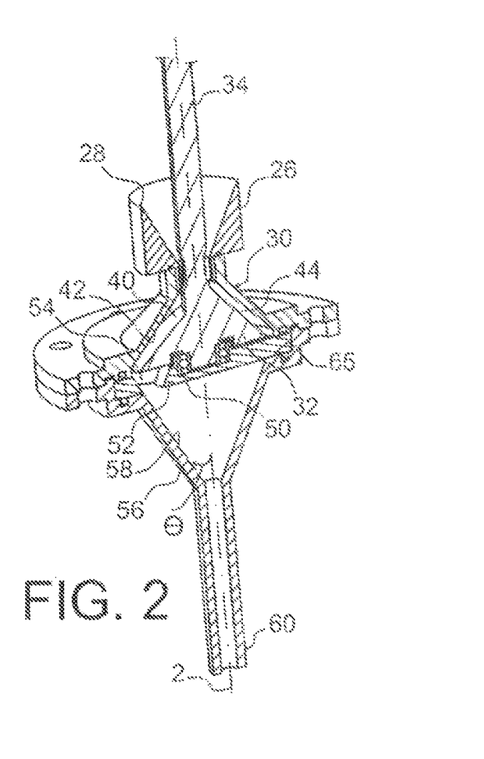
FIG. 2 illustrates a perspective view of a portion of the device shown in FIG. 1.

With reference to FIGS. 1 and 2, a device may be seen for depositing a powder mixture 1 according to a preferred embodiment of the present invention.

This device 1, also called a deposition head, has a succession of elements successively positioned in the vertical direction, corresponding to the direction of the axis 2 of this device, which is preferably provided so as to be substantially orthogonal to the support onto which the mixture of powders is intended to be deposited, during the making of an object. With this, in particular, as detailed hereafter, it is possible to ensure that the powders cross the device 1 essentially by gravity, before being ejected from the latter.

Several tanks of powders are laid out in the upper portion of the head 1. More specifically, in the illustrated preferred embodiment, two distinct tanks are provided, i.e. the tanks R1 and R2 laid out around the axis 2. As an indication, it is noted that as seen from the top, i.e. seen along the direction of the axis 2, the tanks are preferably positioned in an off-centered way with respect to this axis, the latter forming a center of symmetry for the whole of the tanks.

The tank R1 is filled with a powder A1, while the tank R2 is filled with a powder A2 having a composition different from that of A1.

As an indicative example, the powder A1 is a metal material, for example of the type known under the brand of Inconel 600 marketed by Special Metals, corresponding to a complex alloy of nickel, chromium and iron, containing small amounts of carbon, silicon and manganese and having both a great resistance to corrosion and excellent mechanical characteristics. Its grain size may be of the order of 50 to 120 µm. Always as an example, the powder A2 is a ceramic material, for example of the zirconium oxide $ZrO_2$ type, optionally premixed with yttrium trioxide $Y_2O_3$. Its grain size may be of the order of 1 to 120 µm.

In the illustrated embodiment, only two tanks have therefore been provided within the deposition device, each containing a different powder. Nevertheless, depending on the desired object, it is possible that the number of different powders required for obtaining this object be greater than two, for example three, four or even more. In such a case, the deposition device according to the invention is adapted so as to integrate as many tanks as required, preferably always distributed around the axis 2. Also, the control of this device, which will be detailed hereafter, is of course adapted according to the number of different powders applied.

Each tank preferably has an upper aperture for loading the powders into the device, as well as an outlet orifice located opposite the aperture along the vertical direction. Moreover, in any point of the delimitation surface of each tank, this delimitation surface forms an angle preferably of less than 40° with the vertical, and even more preferentially of less than 30° with respect to this direction. With this, the powder may properly flow exclusively by gravity, from the top to the bottom of the tank towards the outlet orifice.

Each tank R1, R2 is equipped with a powder dispensing means cooperating with the outlet orifice of its associated tank, underneath which it is laid out.

In the illustrated preferred embodiment, each dispensing means assumes the shape of a device for delivering powder by vibrations of a powder-supporting element, this type of delivery device being known per se, for example of the type described in document FR 2 666 077 A, incorporated by reference herein.

Thus, a delivery device 4 is coupled with the tank R1, while a delivery device 6 is coupled with the tank R2. Generally, each device 4, 6 has a generator of vibrations 8 driving a rod 10 in a reciprocal movement along the axis 12 of this rod, tilted by an angle α along the horizontal, as shown in FIG. 1 for the device 4. The angle α may be of the order of 20 to 40°.

The opposite end of the rod 10 fixedly bears a powder-supporting element 14, also called a dispensing plate, preferably positioned horizontally, or slightly tilted relatively to the horizontal. Thus, when the generator of vibrations 8 is energized, the support 14 performs a fast reciprocal movement in a direction corresponding to that of the axis 12, according to a given amplitude and frequency, depending on the control signal applied to this generator of vibrations 8.

Figure 4:
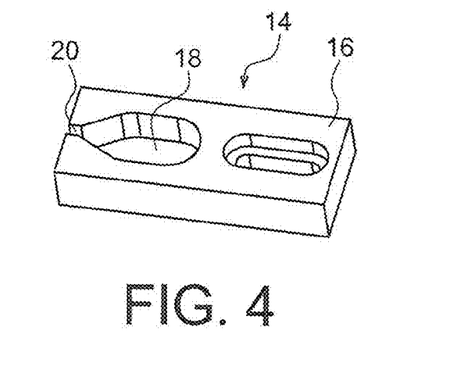
FIG. 4 illustrates a perspective view of a powder support belonging to a device for delivering powder by vibrations, being an integral part of the device shown in FIGS. 1 and 2.
Figure 5:
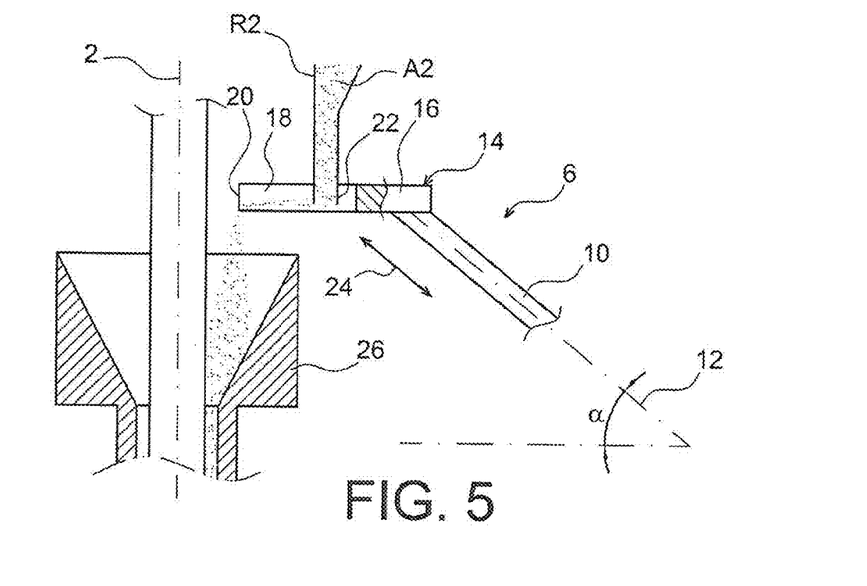
FIG. 5 is a schematic view illustrating the operation of the device for powder delivery by vibrations.

In FIG. 5, a portion of the delivery device has been represented so as to illustrate its operation. As this may be seen in FIG. 4, the powder support 14 comprises an attachment portion 16 intended for connecting it onto the rod 10, and an opposite portion for dispensing the powder 18. The latter portion 18 forms a powder receptacle with a notch 20 for discharging the latter, the outlet orifice 22 of the tank R2 being located opposite and at a small distance from the bottom of this receptacle 18, as shown in FIG. 5. The gap between the outlet orifice 22 and the bottom of the receptacle 18 may be adjusted depending on the encountered needs, for example set to about 1 or 2 mm.

When the support 14 vibrates, as this is schematized by the double arrow 24 oriented along the direction of the reciprocal movement to which it is subject, the powder A2 from the orifice 22 and housed in the bottom of the receptacle 18, gradually moves towards the notch 20, before falling by gravity towards a powder collector 26 which will be described hereafter.

Depending on the amplitude and on the frequency of vibrations of the support 14, the mass flow rate of powder A2, escaping through the notch 20 and exclusively falling by gravity into the collector 26, may be regulated very accurately. In this respect, a correlation is established beforehand between the control applied to the delivery device 6, for example an electric signal, and the mass flow rate of powder A2 escaping from the support 20, which may be assimilated to the flow rate escaping from the tank R2. This correlation, for example assuming the form of a value correspondence table, is preferentially obtained by a calibration operation performed with the device 1, before the use of the latter for making an object. Such a correlation is therefore established for each powder intended to be used. Moreover, if only the operation of the device 6 has been described, it should be understood that the operation of the device 4 is identical or similar, given that it has a same design.

For reasons of bulkiness, the vibratory delivery devices 4, 6 extend from their support 14 substantially radially outwards with respect to the axis 2.

Referring back to FIG. 1 combined with FIG. 2, the deposition head 1 therefore has the powder collector 26 underneath both supports 14, so that the powders A1 and A2 escaping from their respective notches fall by gravity into this collector.

The latter assumes the shape of a convergent tube with the substantially conical delimitation surface 28 of axis 2. Always for facilitating the flow of the powders A1, A2 by gravity within this convergent tube 26, in any point of the delimitation surface 28, this surface forms an angle preferably of less than 40° with the vertical, and even more preferentially less than 30° relatively to this direction.

The collector 26 opens out downwards into a powder mixer 30, which comprises a rotatably mounted mixing member 32 along the axis 2, on which it is centered. This mixing member 32 has a rod 34 passing through the collector 26 towards the upper portion of the head 1, the upper end of this rod being coupled with means 36 for initiating rotation about the axis 2, for example a motor equipped with a transmission belt.

The lower end of this rod 34 is connected to a more bulky portion of the mixing member 32 forming a first surface for impact of the powders 40, of a general conical shape with an axis 2, widening downwards. Moreover, the mixer 30 also includes an outer fixed portion surrounding the rotary mixing member 32. This fixed portion has a second impact surface for the powders 42, with a general conical shape of axis 2, widening downwards, and laid out facing the first impact surface 40 so as to form between the latter an interstice 44 for letting through the powders, also with a general conical shape.

Figure 3:
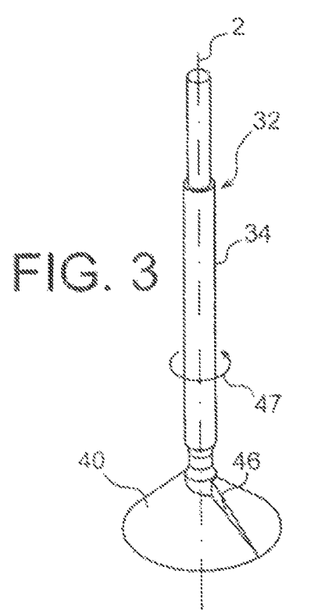
FIG. 3 illustrates a perspective view of the mixing member belonging to the device shown in FIGS. 1 and 2.

As shown in FIG. 3, the impact surface of the powders 40 has one or more recesses 46, preferably extending along a generatrix of the conical surface, for example in a vertical plane passing through the first axis 2. If a single recess 46 is visible in FIG. 3, it is noted that several recesses are preferentially provided, angularly distributed regularly over 360° around the axis 2, for reasons of dynamic behavior of the rotary member 32.

The substantially conical interstice 44 formed between both surfaces 40, 42 for impact of the powders is laid out so as to allow the powder to impact several times the surface 40 of the member 32, and/or the surface 42. It is therefore advantageous that the interstice has a thickness comprised between 1 mm and 1 cm, the thickness being considered along a direction orthogonal to the axis of the cone, which corresponds to the axis 2. It is noted that the thickness of the interstice 44 varies because of the presence of the recesses 46, this thickness for example varying between 3 and 7 mm.

Thus, the powders A1 and A2 falling by gravity into the annular space formed by the outlet orifice of the collector 26 and the rod 34 passing through this orifice, are introduced into the interstice 44 in which they are intimately mixed as soon as their first impact with the conical surface 40 with recesses 46. In this respect, the speed of rotation of the unit 32 is set to a value with which it is for example possible to obtain that a same powder particle is impacted about ten times by the rotary surface 40, during its dwelling in the mixer, this being for example expressed by a speed of rotation of the order of 3,000 rpm applied by the means 36. Advantageously, it is provided that when operating, the rotational member 32 rotates in a direction opposite to the one towards which the recesses 46 are oriented, so as to avoid accumulation of material at these recesses 46. In the example shown in FIG. 3, the rotational member 32 therefore rotates in the counterclockwise direction illustrated by the arrow 47. Thus, the nature and the direction of the recesses preferentially orient the direction of the rotation of the member 32.

For guiding the member 32 in rotation, a rolling bearing 50 is for example provided at the upper portion of the rod 34, and another rolling bearing 50 placed between the lower end of the member 32 and a guiding part 52 in the form of a plate. This part 52, placed horizontally under the interstice 44 of a general conical shape widening downwards, is equipped with one or several passage orifices 54 communicating with a powder mixer collector 56 above which it is found.

Figure 3A:
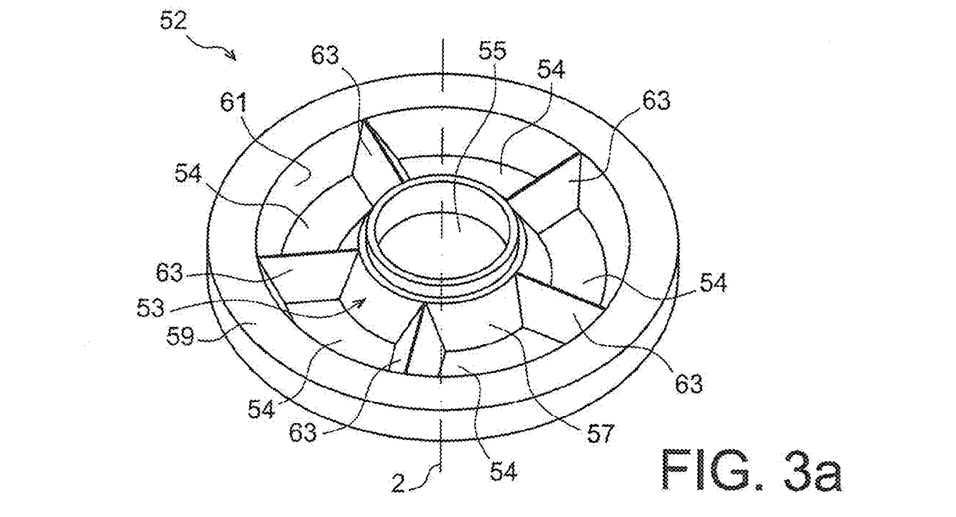
FIG. 3a illustrates a perspective view of the guiding part of the powder mixer belonging to the device shown in FIGS. 1 and 2.

Each orifice 54, intended to be crossed by the mixture of powders under the effect of gravity, is such that in any point of its delimitation surface, this surface forms an angle of less than 40° with the vertical, and still more preferentially of less than 30° with this direction, always with the purpose of promoting proper flow of the powders within the deposition head 1. These orifices 54, distributed around the axis 2, have a globally convergent shape, as shown best by FIG. 3a which shows an exemplary embodiment of the guiding plate 52. In this FIG. 3a, it may be seen that the part 52 centered on the first axis 2 globally comprises a hub 53 having a central housing 55 for receiving the rolling bearing, the tilted outer surface 57 of the hub 53 forming the radially internal surface of the orifices 54. An outer ferrule 59 is positioned concentrically with the hub 53, its tilted interior surface 61 forming the radially external surface of the orifices 54. On the other hand, radial arms 63 connect the hub 53 to the outer ferrule 59. Each arm 63 delimits two orifices 54 on either side of the latter, always by means of tilted surfaces meeting the definition above in terms of angle relatively to the vertical. The upper portion of each radial arm 63 preferably assumes the shape of an edge as thin as possible, in order to limit the risks of accumulation of powders on these edges.

Figure 3B:
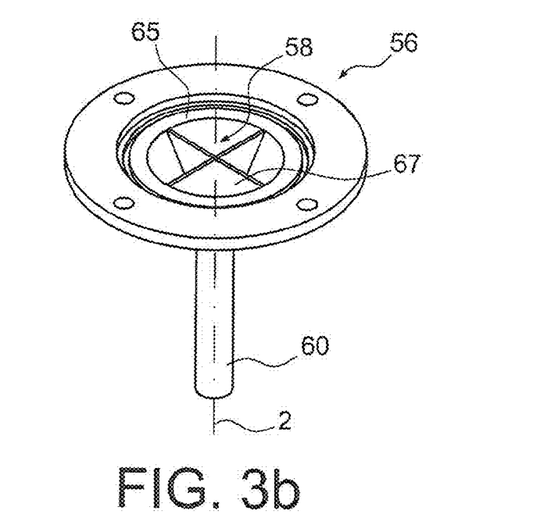
FIG. 3b illustrates a perspective view of the powder mixture collector belonging to the device shown in FIGS. 1 and 2.

Referring back to FIG. 2, it may be seen that just like the orifices 54 crossing the part 52, the powder mixture collector 56 located underneath this part 52, has a globally convergent shape. Here again, in any point of the delimitation surface 58 of this collector 56, this surface forms an angle θ of less than 40° with the vertical, and even more preferentially of less than 30°. The collector 56, centered on the axis 2, has an upper portion forming a seat 65 on which rests the outer ferrule of the guiding part 52. It is of a suitable dimension in order to be able to collect the mixture of powders escaping from each of the orifices 54 provided on the part 52. As shown in FIG. 3b, a means 67 may further be provided in the form of two 90° intertwined stainless steel plates, which will be inserted into the collector 56, this means 67 giving the possibility of breaking the vortex effect adopted by the mixture of powders at the outlet of the orifices 54.

Located underneath in the extension of the collector 56, is found a powder mixture dispenser 60 through which the mixture is extracted from the device 1, always simply by gravity. This dispenser has the shape of a straight channel of small diameter, for example comprised between 2 and 5 mm, centered on the axis 2.

It is noted that the device is intended to be assembled from metal elements, for example in stainless steel 316.

Therefore, as this is apparent from the foregoing, the powders A1, A2 successively cross the tanks R1, R2, the supports 14, 14 of the vibratory delivery devices, the collector 26, the interstice 44, the orifices 54 for letting through the guiding part 52, the collector 56 and the dispenser 60, before escaping from the head 1 in order to form a powder mixture layer. As such, it is noted that the expression « mixture of powders» should be broadly interpreted, i.e. designating both the compositions leaving the deposition head 1 and comprising the powder A1 and the powder A2 and the compositions leaving this head 1 and comprising only the powder A1 or only the powder A2.

Finally, it is indicated that each surface of the device 1 which may be in contact with the powder is provided with low roughness, while for example having an average gap Ra of the order of 0.4 μm.

Figure 6:
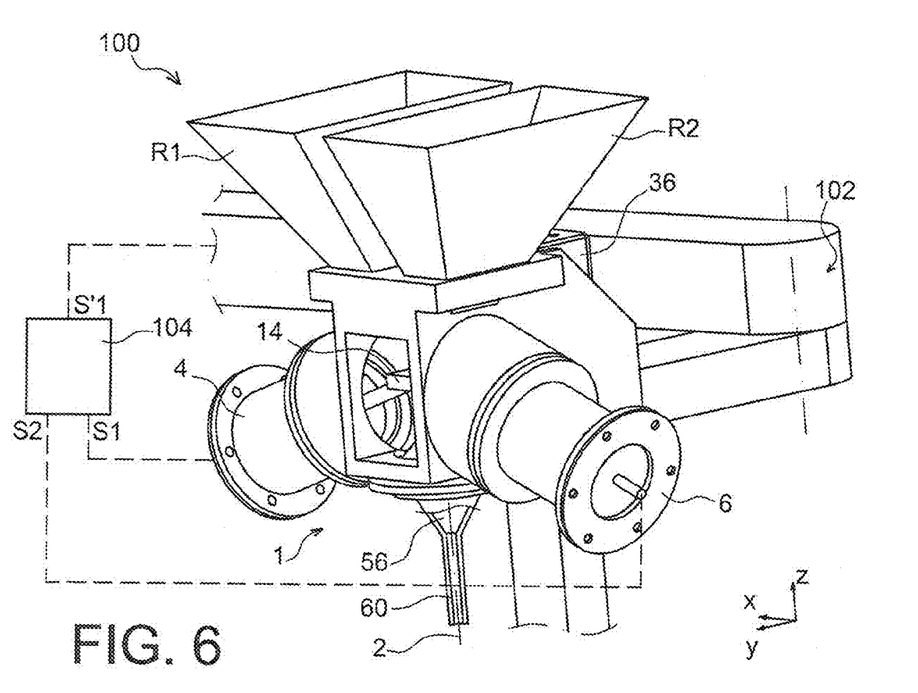
FIG. 6 illustrates a partial perspective view of an installation for depositing a mixture of powders, integrating the deposition device shown in the previous figures.

With reference now to FIG. 6, an installation for depositing a powder mixture 100 may be seen, integrating a deposition head 1 as described above. The head 1 is mounted on a device for initiating spatial movement 102, preferably of the robot type. This robot 102 is preferably designed in order to move the head in any point of a direct orthonormal reference system x,y,z, the coordinate z of which corresponds to the direction of the height of the head 1, therefore parallel to the axis 2.

The installation 100 comprises a control unit 104 with which the robot 102 may be controlled by an output S'1, the dispensing means 4 associated with the powder A1 may be controlled by an output S1, the associated dispensing means 6 associated with the powder A2 may be controlled by an output S2. Further, this control unit 104, comprising conventional elements of the computer, converter type, etc., may also handle the control of the means 36 for setting the mixing member 32 into rotation, even if this has not been illustrated.

Figure 7:
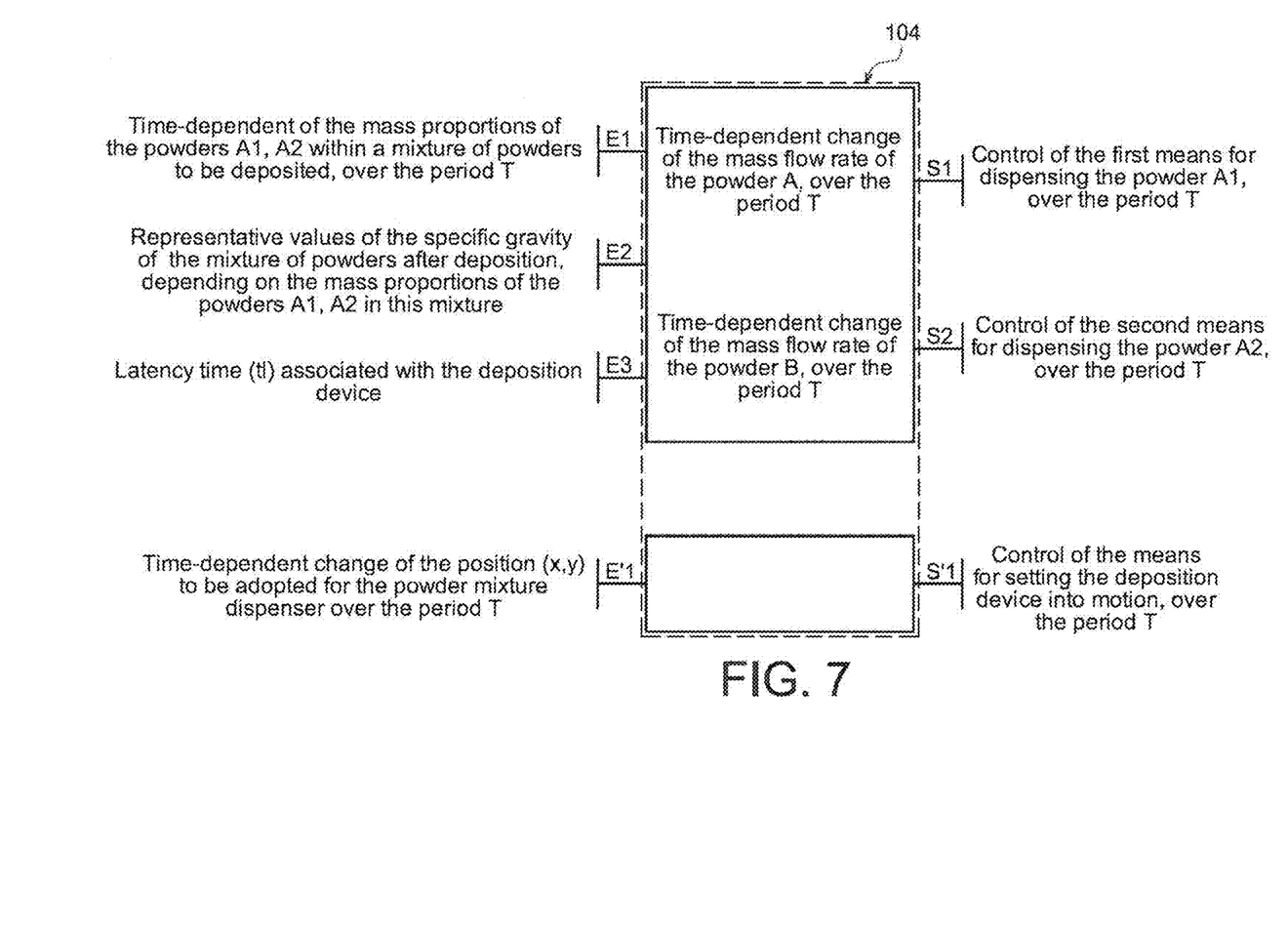
FIG. 7 schematically illustrates the operation of the control unit with which the installation of the previous figure is equipped.

FIG. 7 illustrates a schematic view of an exemplary control unit 104. A first portion is dedicated to the generation of controls for the powder dispensing means, while a second portion is dedicated to the control of the robot 102.

For the first portion, the unit 104 receives several pieces of information through inputs E1, E2, E3. The input E1 relates to the time-dependent change of the mass proportions of the powders A1, A2 within the mixture of powders to be deposited, this time-dependent change being determined over a period T which will be considered subsequently as the period giving the possibility of depositing an entire powder mixture layer. Of course, this time-dependent change in the mass proportions of the mixture is determined according to the desired composition for the layer to be deposited, which is variable in any point of the latter, or constant in certain particular cases.

The input E2 concerns representative values of the specific gravity of the mixture of powders after deposition, depending on the mass proportions of the powders A1, A2 in this mixture. These representative values may be determined beforehand, preferably by calibration performed with this same installation. This may be the actual specific gravity or the density.

The input E3 corresponds to the latency time (t1) associated with the deposition device 1, corresponding to the elapsed time between the instant when controls are transmitted to the powder dispensing means 4, 6 in order to obtain a mixture of powders having given mass proportions, and the instant at which this mixture of powders is deposited after its exiting the dispenser 60. This latency time may also be determined by calibration performed with this same installation.

The unit 104 first of all begins by determining the time-dependent change of the mass flow rates of the powders A1, A2 to be adopted, over the period T. Generally, for each instant t of the period T, the input E1 allows the ratio between both flow rates to be set, the input E2 allows the value of each of these two flow rates to be set while observing the ordered ratio, and the input E3 allows the orders of flow rates to be advanced in time so as to compensate the delay existing between the instant when the flow rate order is given, and the instant when the powder is deposited after having been extracted from the dispenser 60.

It is noted that by taking into account the input E2, it is possible to set the flow rates to values which ensure the formation of a layer with substantially constant thickness, regardless of the time-dependent change in the composition of the mixture of powders within this layer. This proves to be particularly advantageous in the case when the desired object would require the superposition of several layers, implying that any given layer should have a substantially planar and horizontal upper surface, in order to form a suitable support for the direct uppermost layer of the stack.

Next, from the required time-dependent change in the flow rates over the period T, the unit 104 generates at the output S1 a control of the first means 4 for dispensing the powder A1, as well as a control of the second means 6 for dispensing the powder A2 at the output S2. To do this, the correlations described above established beforehand between the controls applied to the delivery devices 4, 6 and the mass flow rates of the powders A1, A2 escaping from the support 20 are preferentially used.

The second portion of the unit 104, dedicated to controlling the robot 102, receives from an input E'1 information relating to the time-dependent change in the position (x,y) to be adopted for the dispenser 60 of the head 1, and this over the period T. These pieces of information are determined beforehand and globally express the path which the dispenser 60 should desirably follow in order to end up with the powder mixture layer, as well as the speed, which may optionally change over time but is preferentially constant over the period T, during which this path should be desirably covered. The unit 104, from E'1, generates at the output S'1 the control of the means for setting the deposition head 1 into motion, ensuring its movement in the x,y plane.

In order to end up with the desired layer, it is of course ensured that the control of the means for setting the device into motion and the controls of the dispensing means are fixed in time relatively to each other.

Figure 8:
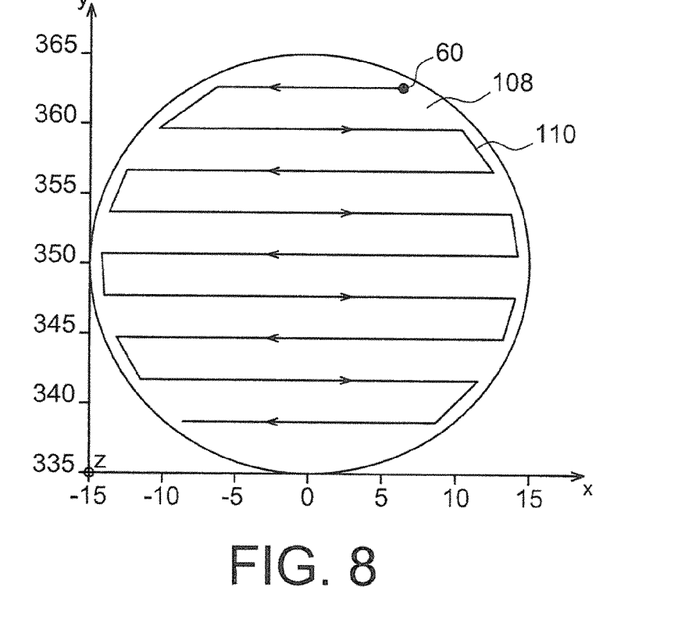
FIG. 8 schematically illustrates the sweep performed by the dispenser for producing a layer of a mixture of powders, performed during the application of a method for making an object with composition gradients according to a preferred embodiment of the present invention.

With reference now to FIG. 8, it may be seen that the reference system x,y,z may be associated with the support or substrate 108 on which the layer is supposed to be deposited. An exemplary path 110 of the dispenser 60 is illustrated in the particular case of a generally disk-shaped layer. This path corresponds to a sweep of the surface of the support 108 intended to be followed by the layer, and for example assumes the form of a plurality of round trips along the direction x, with a shift along the direction y between each round trip.

Figure 8A:
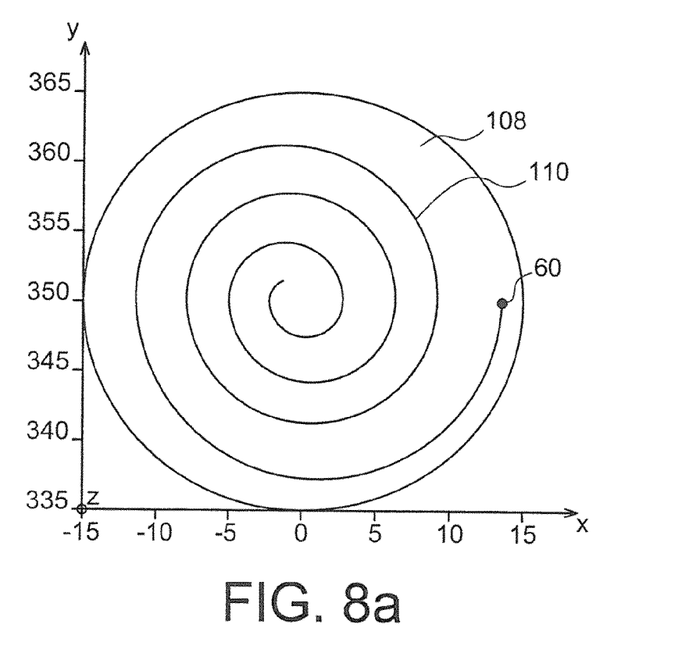
FIG. 8a is similar to FIG. 8, and illustrates a sweep according to an alternative embodiment.

During this travel, the composition of the mixture of powders may of course change over time, notably with view to the formation of one or more composition gradients in the x,y plane of the obtained layer. An alternative embodiment is shown in FIG. 8a, in which the path 110a is spiral-shaped.

Figure 9:
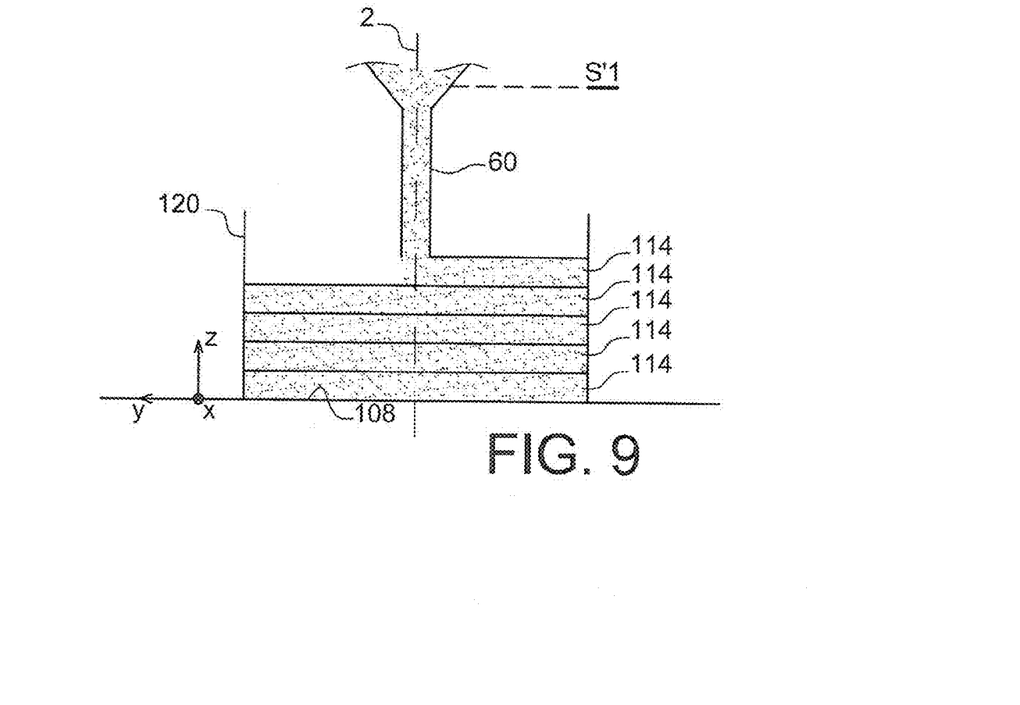
FIG. 9 schematically illustrates a method according to a preferred embodiment of the present invention, wherein the desired object with composition gradients is made from a stack of several powder mixture layers.

Finally, it is noted that the method may be extended to the formation of an object by stacking several layers 114 along the direction z, as shown by FIG. 9. In this case, the controls S1, S2 and S'1 may be provided over a period T corresponding to the duration required for making all these layers. This may notably imply that the control S'1 also handles the altitude z of the dispenser 60 relatively to the surface of the support 108, preferably in order to keep an always substantially identical distance between the low end of the dispenser 60 and the layer deposited beforehand.

In FIG. 9, it may be seen that the support 108 is an integral part of a container 120, for which it forms the bottom. The different layers 114 are deposited in this container 120, one after the other, in order to form the desired stack which may have one or several composition gradients along the z direction.

Figure 9A:
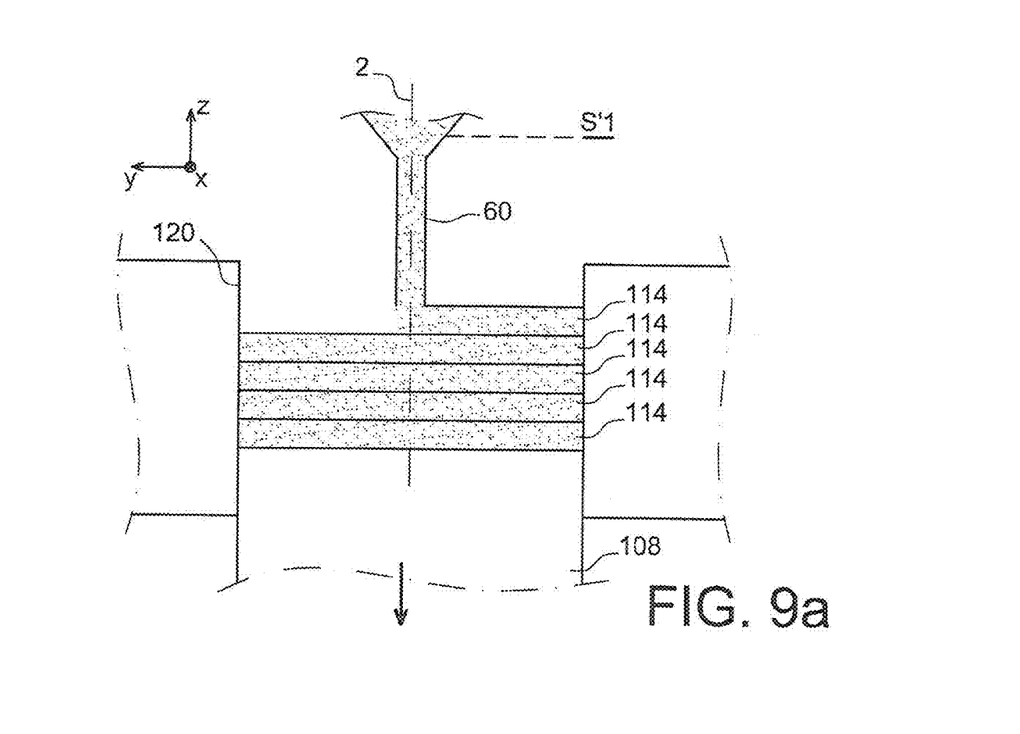
FIG. 9a is similar to FIG. 9, and illustrates an alternative embodiment.

An alternative embodiment consists of providing that the bottom 108 is mobile along the z direction and the dispenser 60 fixed in this same direction, as schematized in FIG. 9a. In this scenario, the bottom 108 then assumes the shape of a piston which moves downwards after making each layer, along a distance preferably close to or identical with the thickness of the layers.

As an indication, it is noted that each layer 114 may have a thickness of the order of 0.25 mm, and the final stack a thickness of the order of 27 mm.

Further, once the deposition of the mixture of powders is finished, it is proceeded with its consolidation according to any known technique, with which the object with composition gradients may be obtained. In the example shown in FIG. 9, the stack is then cold compacted in order to make the assembly able to be handled, i.e. without any risk of disordering the powders of the stack. Next, the manufacturing method is continued by densifying the assembly with a hot isostatic compression operation also called HIC, although other techniques may be used, without departing from the scope of the invention. For achieving this hot isostatic compression, the compacted stack is first of all degassed and sealed by the container 120 in which it is found. Next, densification is obtained by placing the assembly in an enclosure at a temperature of about 1,325° C. and at a pressure of about 1,400 bars, in order to obtain hot isostatic compression.

Figure 10A:
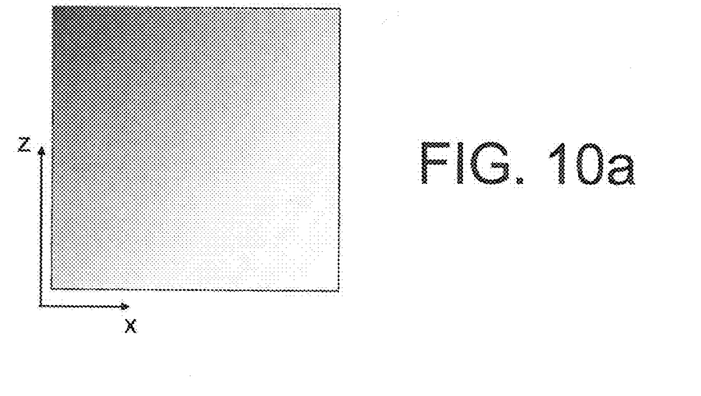
FIGS. 10a to 10c are sectional views of objects with composition gradients which may be obtained with the present invention.
Figure 10B:
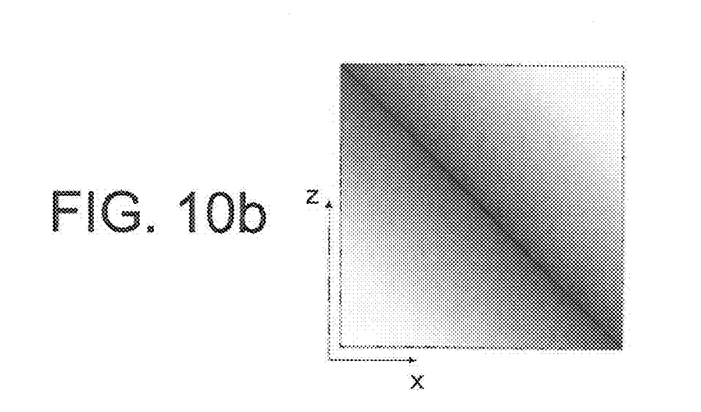
Figure 10C:
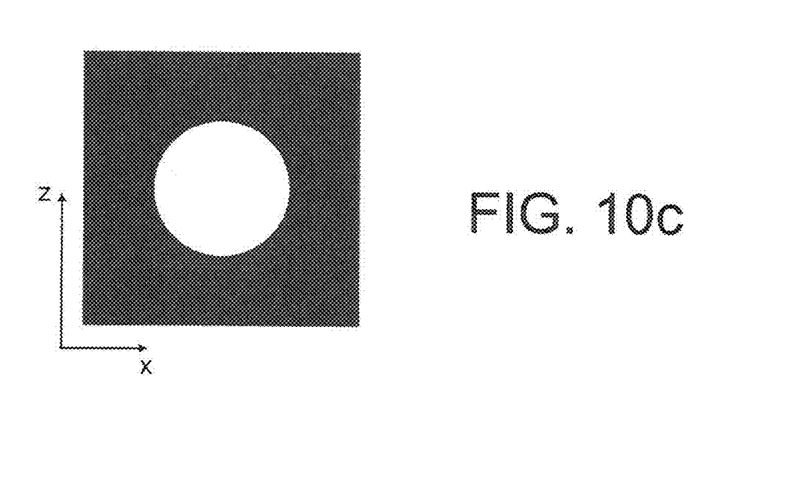

As mentioned above, the obtained three-dimensional object may have one or several composition gradients in any direction of the reference system x,y,z. In this respect, FIGS. 10a-10c show, as a sectional view along x,z planes, objects which may be obtained with the present invention.

In these figures, the darker the color, the larger is the mass proportion of powder A1 in the mixture, and the lighter the color, the larger is the mass proportion of powder A2 in the mixture. FIGS. 10a and 10b therefore show embodiments with different gradual composition gradients in the x,z plane, while the white spot of FIG. 10c may correspond to a sphere integrated within the black envelope made in a material other than that of the sphere.

Several applications are possible for the thereby made objects with composition gradients. Among the latter, are included parts for aircraft jet engines, heat exchangers, notably in nuclear reactors, steam reformers, biomass reactors, fuel cells, electrolyzers, etc.

Of course, various modifications may be made by one skilled to the art to the invention which has just been described, only as non-limiting examples.

The invention claimed is:

1. An installation for depositing a mixture of powders for forming an object with composition gradients, comprising:
 a device, mounted on means for initiating spatial movement, the device comprising:
  a plurality of tanks respectively configured to contain different powders;
  a powder collector under the plurality of tanks that collects respective powders of the plurality of tanks, the powder collector including a conical inner surface;
  a powder mixer placed under the powder collector, the powder mixer including a rotationally mounted mixing member and configured to be impacted by the powders from the plurality of tanks, the mixing member including a rod that passes through the powder collector along an axis of rotation of the mixing member;
  a plurality of means for dispensing powder respectively cooperating with the plurality of tanks, and each configured to regulate mass flow rate of powder escaping from a respective of the plurality of tanks towards the powder mixer;
  a powder mixture collector placed under the powder mixer and communicating with the powder mixer; and
  a powder mixture dispenser placed under the powder mixture collector and communicating with the powder mixture collector, and
 a control unit with which the means for initiating spatial movement, and each of the plurality of means for dispensing powder, are controlled,
 wherein the rotationally mounted mixing member includes a first powder impact surface for impact of the powders of a general conical shape with an axis corresponding to the axis of rotation of the mixing member,
 wherein the powder mixer includes a second powder impact surface of a general conical shape, laid out coaxially and facing the first powder impact surface, to form between the first powder impact surface, an interstice with a general conical shape, and
 wherein the powders fall from an annular space between the rod and the inner surface of the powder mixture collector into the interstice.

2. The installation according to claim 1, wherein the control unit takes into account, to control each of the dispensing means over a period T:
 a time-dependent change in mass proportions of the powders within a mixture of powders to be deposited, over the period T;
 representative values of specific gravity of the mixtures of powders after the deposition, depending on mass proportions of the powders in the mixture; and
 a latency time associated with the device, corresponding to a time having elapsed between an instant when controls are transmitted to the means for dispensing powder to obtain a mixture of powders having given mass proportions, and an instant at which this mixture of powders is deposited.

3. The installation according to claim 1, wherein the control unit takes into account, to control the means initiating spatial movement, over a period T, a time-dependent change in position to be adopted for the powder mixture dispenser, over the period T.

4. The installation according to claim 1, wherein the first powder impact surface with a general conical shape includes one or more recesses.

5. The installation according to claim 1, wherein the mixing member is rotatably mounted on a guiding part of the powder miver, including at least one passage orifice communicating with the powder mixture collector above which they are found.

6. The installation according to claim 5, wherein in any point of a delimitation surface of each passage orifice, the delimitation surface forms an angle of less than 40° with the vertical.

7. The installation according to claim 1, wherein in any point of a delimitation surface of the powder mixture collector, this delimitation surface forms an angle of less than 40° with the vertical.

8. The installation according to claim 1, further comprising a collector of the powders placed under the dispensing means, between the dispensing means and the powder miver.

9. The installation according to claim 8, wherein in any point of a delimitation surface of the collector of the powders, the delimitation surface forms an angle of less 40° with the vertical.

10. The installation according to claim 1, wherein each of the means for dispensing powder has a form of a device for delivering powder by vibrations of a powder supporting element.

* * * * *